June 12, 1962     Z. CUNNINGHAM     3,038,528
TIRE MOUNTING APPARATUS
Filed Dec. 31, 1959     4 Sheets-Sheet 1
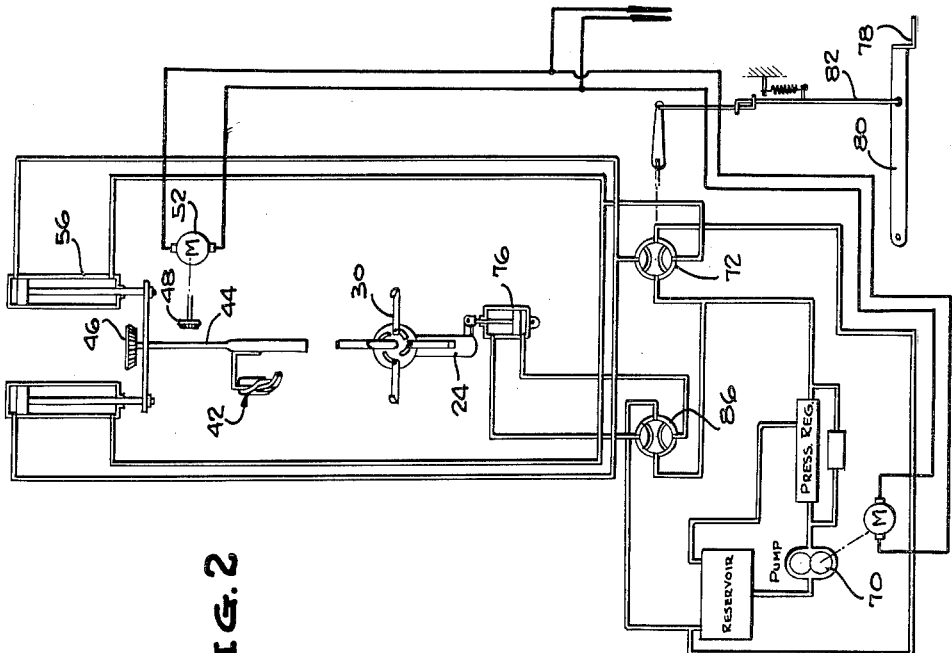
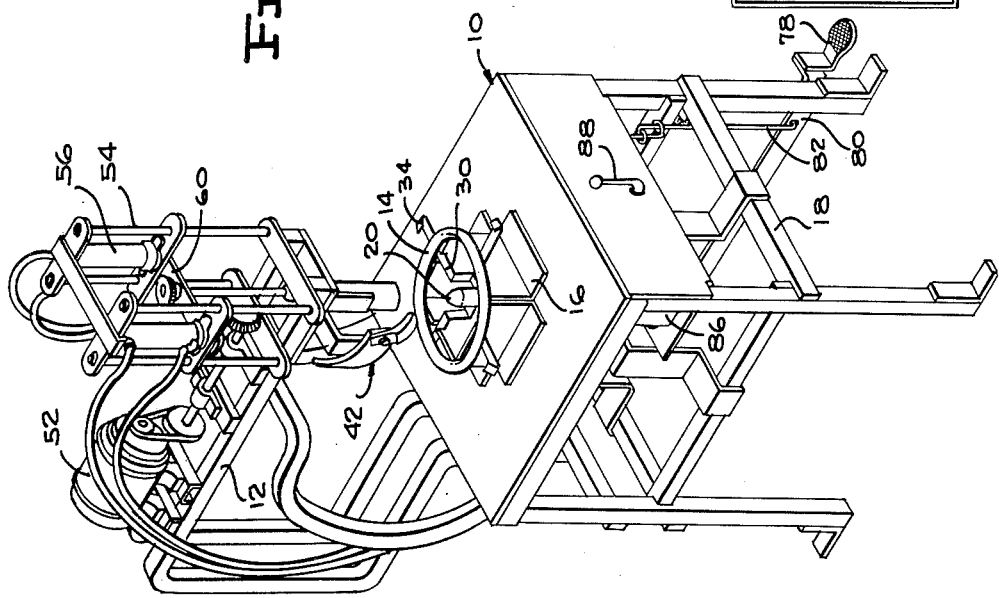
INVENTOR.
ZED CUNNINGHAM
BY
McMorrow, Berman & Davidson
ATTORNEYS

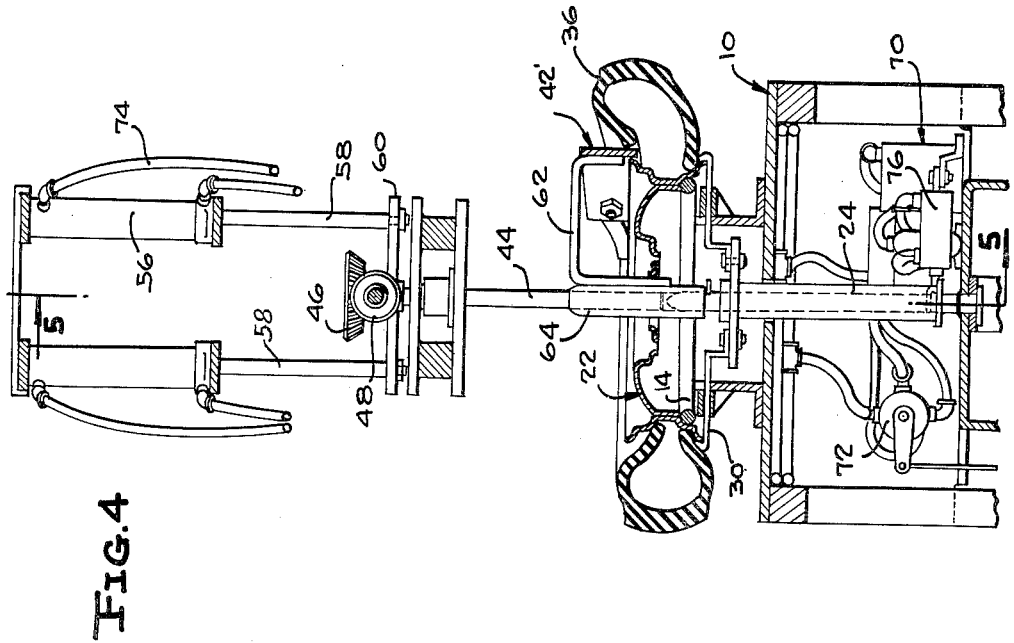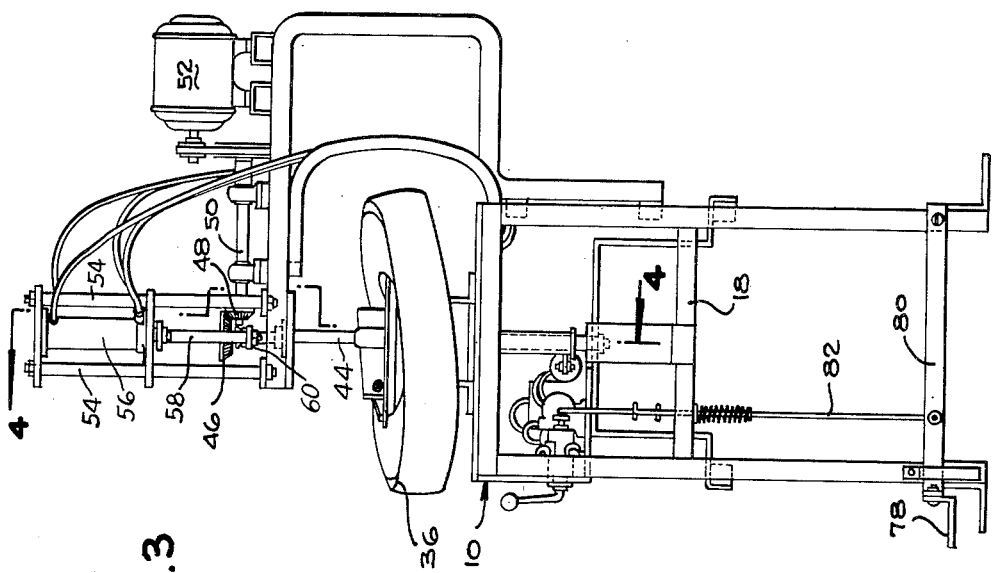

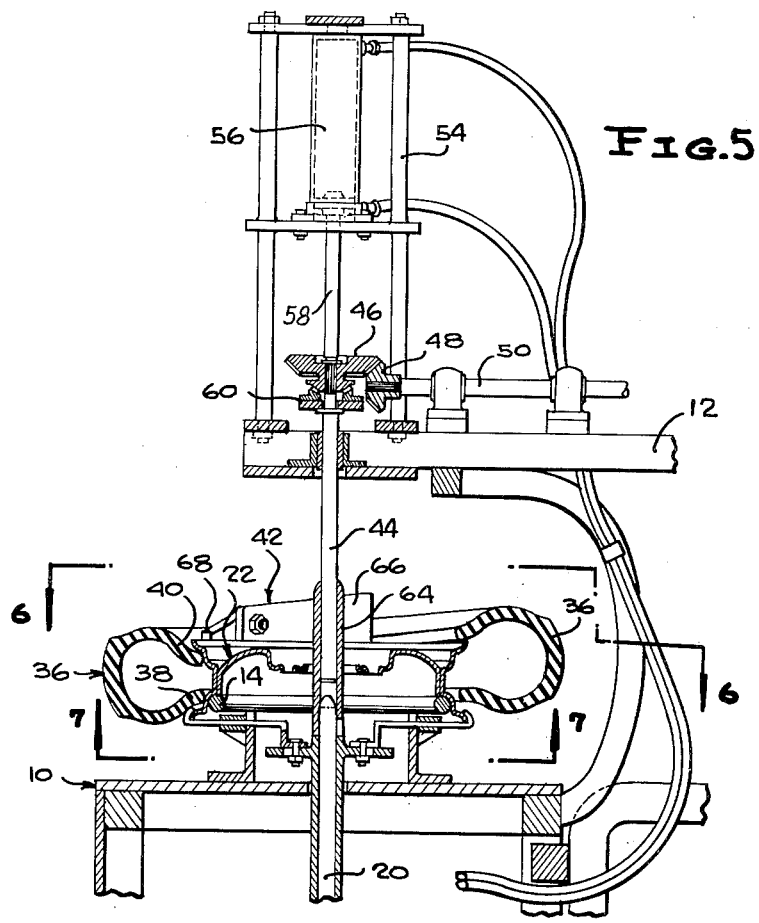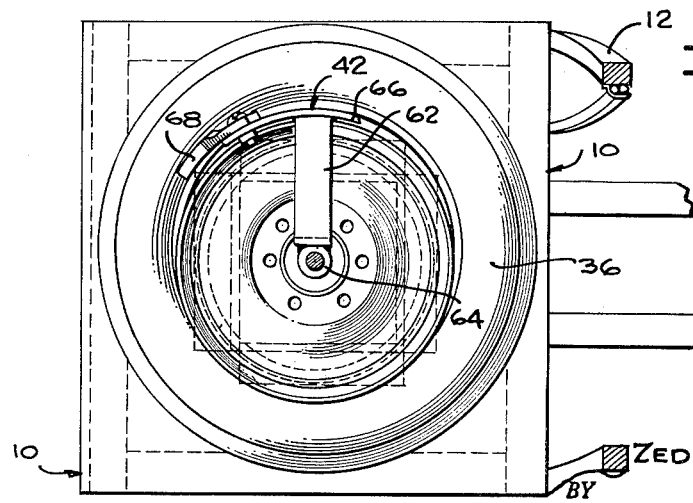

June 12, 1962                Z. CUNNINGHAM                3,038,528
                            TIRE MOUNTING APPARATUS
Filed Dec. 31, 1959                                    4 Sheets-Sheet 4
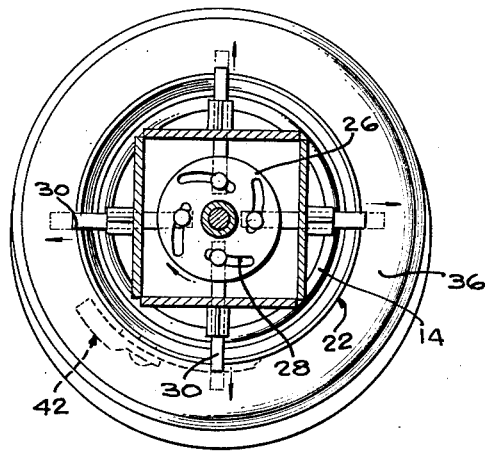
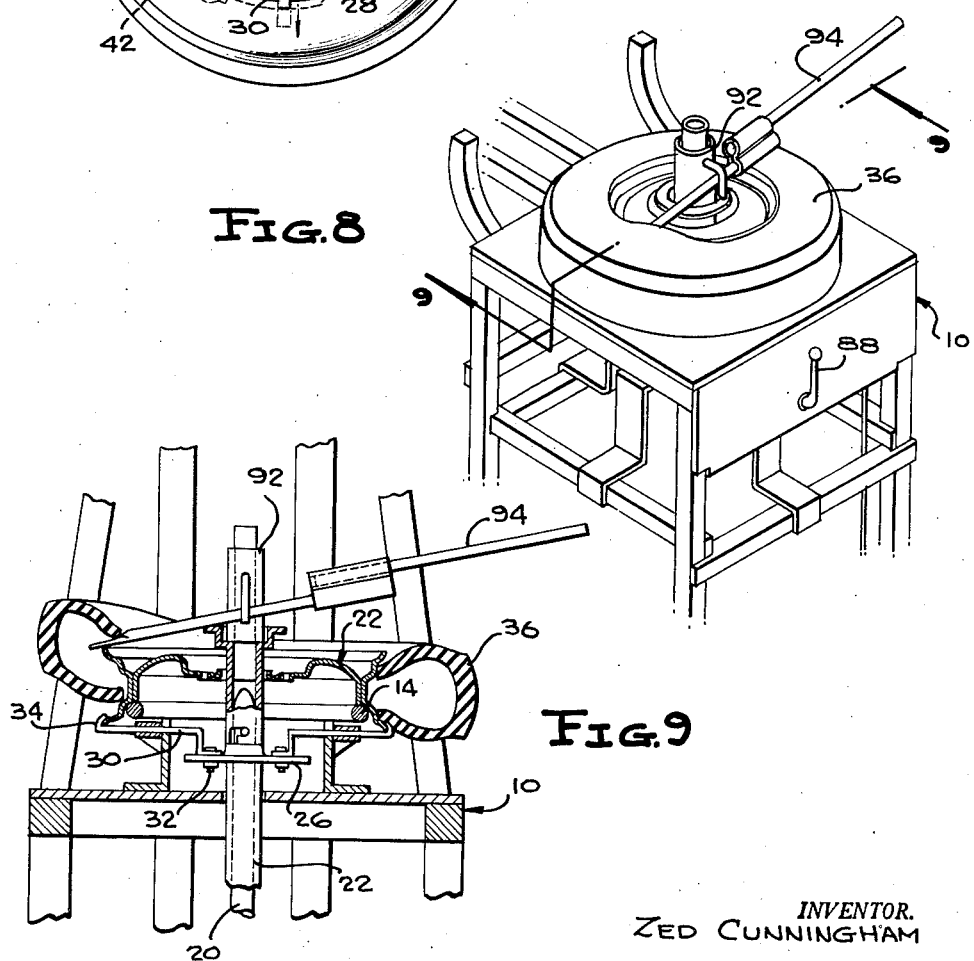
INVENTOR.
ZED CUNNINGHAM
BY
McMorrow, Berman & Davidson
ATTORNEYS United States Patent Office 3,038,528
Patented June 12, 1962

3,038,528
TIRE MOUNTING APPARATUS
Zed Cunningham, 2510 E. 59th St., Cleveland 4, Ohio
Filed Dec. 31, 1959, Ser. No. 863,203
2 Claims. (Cl. 157—1.24)

The present invention relates to an apparatus for mounting a tire on a drop-center wheel rim.

In the automotive industry, the mounting of tire casings on wheel rims, especially the mounting of new tire casings, is a time-consuming operation requiring the services of at least a semiskilled operator. The tubeless tires presently employed are particularly subject to damage while being mounted on a wheel rim in the usual manner. The present method of mounting the tire on a wheel rim consists in placing one of the beads in the drop-center on one side of the rim and with a tool forcing the opposed portion of the bead over the rim, followed by forcing the other bead into the drop-center and with another tool forcing the remaining part of the bead over the rim into the drop center for spreading to the parts of the rim on each side of the drop-center. The method frequently results in damaging the bead portion of a tire to the extent that it is impossible to form an air-tight seal between the rim and the bead.

An object of the present invention is to provide an apparatus for mounting a tire on a drop-center wheel rim which is efficient in operation and may be performed by an unskilled operator.

Another object of the present invention is to provide an apparatus for mounting a tire on a drop-center wheel rim which may be employed to mount tubeless tires on rims without possibility of damage to the tire.

A further object of the present invention is to provide a tire mounting apparatus which is semiautomatic in operation, one which enables an operator to mount tires on drop-center wheel rims with ease and facility and at a saving in time and labor, and one which is economically feasible.

A still further object of the present invention is to provide an apparatus for mounting a tire on a drop-center wheel rim which is sturdy in construction, one fabricated of known components and one which is highly effective in action.

These and other objects and advantages of the present invention will be fully apparent from the following description when taken in conjunction with the annexed drawings, in which:

FIGURE 1 is an isometric view of the apparatus according to the present invention;

FIGURE 2 is a schematic view;

FIGURE 3 is a side elevational view of the apparatus, showing a tire partially mounted upon a wheel rim;

FIGURE 4 is a view on an enlarged scale, taken on the line 4—4 of FIGURE 3;

FIGURE 5 is a fragmentary view in section of the upper portion of the apparatus;

FIGURE 6 is a view taken on the line 6—6 of FIGURE 5;

FIGURE 7 is a view taken on the line 7—7 of FIGURE 5;

FIGURE 8 is a fragmentary isometric view showing a portion of the apparatus with a tire installed thereon and a tool in position for removing the tire from the wheel rim; and FIGURE 9 is a view taken on the line 9—9 of FIGURE 8.

Referring in greater detail to the drawings in which like numerals indicate like parts throughout the several views, the apparatus of the present invention comprises a table-like base 10 having an overhead frame 12 supported thereon. A horizontally disposed ring member 14, FIGURES 1 and 5, is supported in spaced relation with respect to the base 10 on the free ends of the uprights or long legs of four L-shaped members 16 arranged with their long legs vertical and surrounding an opening in the base 10 and with their short legs resting upon and fixedly secured to the base 10.

A subframe 18, below the base 10, supports the lower end of a post 20 which has its upper end terminating at substantially the level of the ring member 14.

As shown most clearly in FIGURES 4 and 5, the ring member 14 is conformably shaped to fit the portion of a drop-center wheel rim 22 on one side of the drop-center when the wheel rim 22 rests upon the ring member 14.

Holding means is carried by the base 10 and releasably engages the wheel rim 22. Specifically, this holding means, FIGURE 4, consists in a sleeve 24 circumposed about the post 20 and rotatably supported thereon.

Carried on the upper end of the sleeve 24 is a horizontally disposed plate 26 having a plurality of slots 28 arranged so as to spiral outwardly, each slot 28 being arcuate in shape, as shown most clearly in FIGURE 7.

A plurality of clamp members or bars 30 are arranged in radial spaced relation about the sleeve 24 and each has one end connected by a pin 32 to the adjacent slot 28 in the plate 26. A hook 34 is on the other end of each of the bars 30 and is releasably engaged with the adjacent portion of the periphery of the rim 22, as shown most clearly in FIGURE 9. Rotary movement of the sleeve 24 in one direction will thus cause movement of the hooks 34 radially outwardly and rotary movement of said sleeve in another direction will cause movement of the hooks radially inwardly into clamping engagement with the rim.

A tire casing 36 is disposed so that one bead is within the rim 22 and the other bead is exteriorly of and above the rim 22, the beads being designated by the reference numerals 38 and 40, respectively. FIGURES 5 and 6 show the tire casing 36 with a portion of the upper bead 40 already inserted into the rim by the action of the tool of the present invention.

The tool for inserting the upper bead 40 into the rim 22 consists in a pressure-applying means, designated generally by the reference numeral 42 in FIGURES 2 and 5.

The overhead frame 12 supports a vertically disposed rotatable shaft 44 disposed in axial alignment with respect to the post 20 and connected to the frame 12 for upward and downward movement toward and away from the post 20. A bevel gear 46 is secured to the upper end of the shaft 44 and is movable therewith upwardly and downwardly and also rotatable therewith. When the shaft 44 is at the limit of its downward movement, the bevel gear 46 is in mesh with another bevel gear 48 carried upon a drive shaft 50 which is driven by a motor 52, as shown in FIGURES 1 and 3.

The drive shaft 50 and motor 52 are supported on the upper end of the frame 12 and a pair of standards rise from the frame 12 on each side of the shafts 44. Each pair of standards 54 supports a hydraulic cylinder assembly 56 which has the piston rod 58 thereof connected to a horizontally disposed connector 60. The shaft 44 is rotatably mounted in the connector 60 and for upward and downward movement therewith responsive to actuation of the hydraulic cylinder assembly 56.

The pressure-applying means 42 is carried upon one end of a radially extending member 62 which has its inner end fixedly secured to a sleeve 64 which is circumposed about and is fixedly secured to the lower end portion of the shaft 44, as shown in FIGURES 5 and 6.

The lower end of the shaft 44 is inwardly of the lower end of the sleeve 64 so that a socket is formed for the reception of the upper end portion of the post 20, as shown in FIGURE 5. This serves as a steadying means for the shaft 44 when the latter executes its downward movement to the position in which the gears 46 and 48 are in mesh and when it executes its rotary movement responsive to rotation of the drive shaft 50.

The pressure-applying means consists in an upstanding arcuately curved plate 66 having a foot 68 projecting from one end thereof and on the outside thereof.

Supported upon the subframe 18 is a hydraulic fluid pump 70, the output of which is controlled by a valve 72 connected by conduits 74 to the hydraulic cylinder assembly 56. A hydraulic actuator 76 is mounted upon the subframe 18 and is operatively connected to the sleeve 24 for effecting the partial rotation of the sleeve 24 first in one direction and then in the other direction to control the clamping action of the bars 30. A foot pedal 78 on one end of a lever 80 is connected by a rod 82 to the valve 72 so that the latter may be actuated to the position in which fluid is admitted to the hydraulic cylinder assemblies 56, as desired.

A valve 86 (FIGURE 1) is carried by the subframe 18 and has an operating handle 88 exteriorly of and forwardly of the base 10. The valve 86 controls admission of fluid into and out of the actuator 76 so as to effect the rotation of the sleeve 24 first in one direction and then in the other.

In operation, a source of electric current is connected to the motor of the pump 70. With a rim 22 supported on the ring member 14 and a casing 36 positioned with one bead received in the drop-center of the rim 22, the valve 72 is turned to the position in which fluid is admitted to the hydraulic cylinder assembly 56 which results in lowering of the shaft 44 with the pressure-applying means 42 thereon. Upon execution of part of the movement downwardly of the shaft 44, the pressure-applying means 42 will engage the bead of the casing 36 which is above and out of the rim 22. Upon execution of the remaining part of the downward movement of the shaft 44, the bead will be pressed into the rim 22 by the pressure-applying means 42. Next, the motor 52 is actuated to rotate the drive shaft 50 and thereby the shaft 44 with its pressure-applying means 42 to force the entire length of the bead into the rim. The valves 72 and 86 are then reversed to release the rim from the ring member 14 and to raise the shaft 44 to the limit of its upward movement. The wheel with the attached tire casing is then ready for removal from the ring member 14.

As shown in FIGURES 8 and 9, when it is desired to remove the casing 36 from the rim 22, a tool rest assembly 92 is inserted over the post 20 and a hand tool 94 is placed in abutting relation with respect to the rest 92 and against which the hand tool 94 bears to apply leverage to the bead of the casing 36 to remove same from the rim 22, as shown in FIGURE 9.

What is claimed is:

1. An apparatus for mounting a tire casing on a drop-center rim comprising a base, a plurality of uprights arranged in spaced relation about and rising from said base, a horizontally-disposed ring member fixedly supported on the upper ends of said uprights, said ring member being conformably shaped to fit the portion of a drop-center wheel rim on one side of the drop center, holding means embodying a post rising from said base between said uprights, a sleeve circumposed about and rotatable about said post, a horizontally-disposed plate surrounding said sleeve and fixedly secured to said sleeve, there being a plurality of arcuately-shaped slots in said plate and disposed in spaced relation about the center point thereof, a plurality of clamp members arranged in spaced relation about said sleeve, each clamp member extending slidably through an adjacent upright and having one end connected to said plate by a pin extending through an adjacent slot in said plate for movement of said clamp member away from said sleeve in response to execution of rotary movement of said sleeve in one direction and for movement of said clamp member toward said sleeve responsive to execution of rotary movement of said sleeve in the other direction, the other end of each of said clamp members being provided with a hook adapted to releasably engage a peripheral portion of a wheel rim when supported on said ring member, and pressure-applying means positioned in vertical spaced relation with respect to said ring member and connected to said base for upward and downward movement toward and away from said ring member and for traveling movement about said ring member, said pressure-applying means comprising a vertically-disposed rotatable shaft positioned above and in axial alignment with respect to said post, a pressure-applying element on the lower end of said shaft and laterally spaced therefrom, a pair of hydraulic cylinder assemblies positioned above and operatively connected to the upper end of said shaft for forcibly shifting said shaft downward toward the ring member to thereby urge said pressure element into engagement with the tire bead when supported on said ring member, and means operatively connected to said shaft for rotating the latter when in the downwardly moved position.

2. The apparatus according to claim 1, wherein said last-mentioned means comprises a bevel gear on the upper end of said shaft, a driven shaft at right angles to said shaft, a complemental bevel gear on said driven shaft engageable with said bevel gear when said vertical shaft is at its downwardly moved position, and motor means for rotating the driven shaft to thereby execute the traveling movement of said pressure-applying element about said ring member.

References Cited in the file of this patent

UNITED STATES PATENTS

| | | |
|---|---|---|
| 1,416,094 | Krauska | May 16, 1922 |
| 2,219,238 | St. John | Oct. 22, 1940 |
| 2,351,355 | Merrett | June 13, 1944 |
| 2,569,788 | Weaver | Oct. 2, 1951 |
| 2,577,684 | Horne | Dec. 4, 1951 |
| 2,661,053 | Mullen | Dec. 1, 1953 |
| 2,695,659 | Athmann | Nov. 30, 1954 |
| 2,912,047 | Douglas et al. | Nov. 10, 1959 |

FOREIGN PATENTS

| | | |
|---|---|---|
| 670,188 | Great Britain | Apr. 16, 1952 |
| 492,250 | France | July 2, 1919 |